United States Patent
Lee et al.

(10) Patent No.: US 9,442,523 B2
(45) Date of Patent: Sep. 13, 2016

(54) USER-WEARABLE DEVICES WITH POWER CONSERVING FEATURES

(71) Applicant: Salutron, Inc., Fremont, CA (US)

(72) Inventors: Yong Jin Lee, Palo Alto, CA (US); Leo Bellontindos, Kowloon (HK); Junnifer Tumanda, Kowloon (HK); Jhovenden Baroro, Kowloon (HK); Eddy Hui, Kowloon (HK); Francis Uy, Kowloon (HK); Buu Chau, Oakland, CA (US)

(73) Assignee: SALUTRON, INC., Fremont, CA (US)

( * ) Notice: Subject to any disclaimer, the term of this patent is extended or adjusted under 35 U.S.C. 154(b) by 41 days.

(21) Appl. No.: 14/341,248

(22) Filed: Jul. 25, 2014

(65) Prior Publication Data
US 2016/0026212 A1    Jan. 28, 2016

(51) Int. Cl.
*G06F 1/16* (2006.01)

(52) U.S. Cl.
CPC .................... *G06F 1/163* (2013.01)

(58) Field of Classification Search
CPC ................ G06F 19/36; G06F 1/163; G06F 2203/04104; G06F 3/014; G06F 3/015; G06F 21/316; G06F 2221/2133; G06F 3/011
USPC .................................................. 361/679.03
See application file for complete search history.

(56) References Cited

U.S. PATENT DOCUMENTS

| | | |
|---|---|---|
| 5,810,736 A | 9/1998 | Pail |
| 2006/0253010 A1 | 11/2006 | Brady et al. |
| 2007/0159926 A1 | 7/2007 | Prstojevich et al. |
| 2007/0265533 A1 | 11/2007 | Tran |
| 2010/0112964 A1 | 5/2010 | Yi et al. |
| 2011/0191044 A1 | 8/2011 | Stafford |
| 2013/0072765 A1* | 3/2013 | Kahn ........................ A61B 5/01 600/301 |
| 2013/0078651 A1* | 3/2013 | Nakagawa ............. G01N 33/53 435/7.92 |
| 2013/0079619 A1* | 3/2013 | Lee ....................... A61B 5/7214 600/393 |

* cited by examiner

*Primary Examiner* — Anthony Haughton
*Assistant Examiner* — Ingrid Wright
(74) *Attorney, Agent, or Firm* — Vierra Magen Marcus LLP

(57) ABSTRACT

A user-wearable devices includes an on-body detector that uses one or more sensors of the device to detect whether or not the user-wearable device is being worn by a user. When the user-wearable device is detected as being worn by a user it is operated in a first mode, and when the user-wearable device is detected as not being worn by a user it is operated in a second mode that consumes less power than the first mode. Operating the user-wearable device in the first mode can include enabling wireless communication between the user-wearable device and a base station. Operating the user-wearable device in the second mode can include disabling wireless communication between the user-wearable device and a base station. Operating the user-wearable device in the second mode can also include disabling sensors of the user-wearable device and/or placing sensors of the user-wearable device in a low power mode.

22 Claims, 12 Drawing Sheets

USER-WEARABLE DEVICES WITH POWER CONSERVING FEATURES

BACKGROUND

User-wearable devices, such as activity monitors or actigraphs, have become popular as a tool for promoting exercise and a healthy lifestyle. Such user-wearable devices can be used, for example, to measure heart rate, steps taken while walking or running and/or estimate an amount of calories burned. Additionally, or alternatively, a user-wearable device can be used to monitor sleep related metrics. User-wearable devices, such as smart watches, can additionally or alternatively be used to provide alerts to a user. Such user-wearable devices are typically battery operated. Because such user-wearable devices are often used to perform numerous functions that consume power, if not appropriately designed and operated the battery life of such devices can be relatively short, which is undesirable.

SUMMARY

Certain embodiments of the present invention relate to a user-wearable device that includes an on-body detector that uses one or more sensors of the user-wearable device to detect whether or not the user-wearable device is being worn by a user. When the user-wearable device is detected as being worn by a user it is operated in a first mode, and when the user-wearable device is detected as not being worn by a user it is operated in a second mode that consumes less power than the first mode. Operating the user-wearable device in the first mode can include enabling wireless communication between the user-wearable device and a base station. Operating the user-wearable device in the second mode can include disabling wireless communication between the user-wearable device and a base station. Operating the user-wearable device in the second mode can also include disabling sensors of the user-wearable device and/or placing sensors of the user-wearable device in a low power mode.

This summary is provided to introduce a selection of concepts in a simplified form that are further described below in the description. This summary is not intended to identify key features or essential features of the claimed subject matter, nor is it intended to be used to limit the scope of the claimed subject matter. Further and alternative embodiments, and the features, aspects, and advantages of the embodiments of invention will become more apparent from the detailed description set forth below, the drawings and the claims.

DETAILED DESCRIPTION

Figure 1:
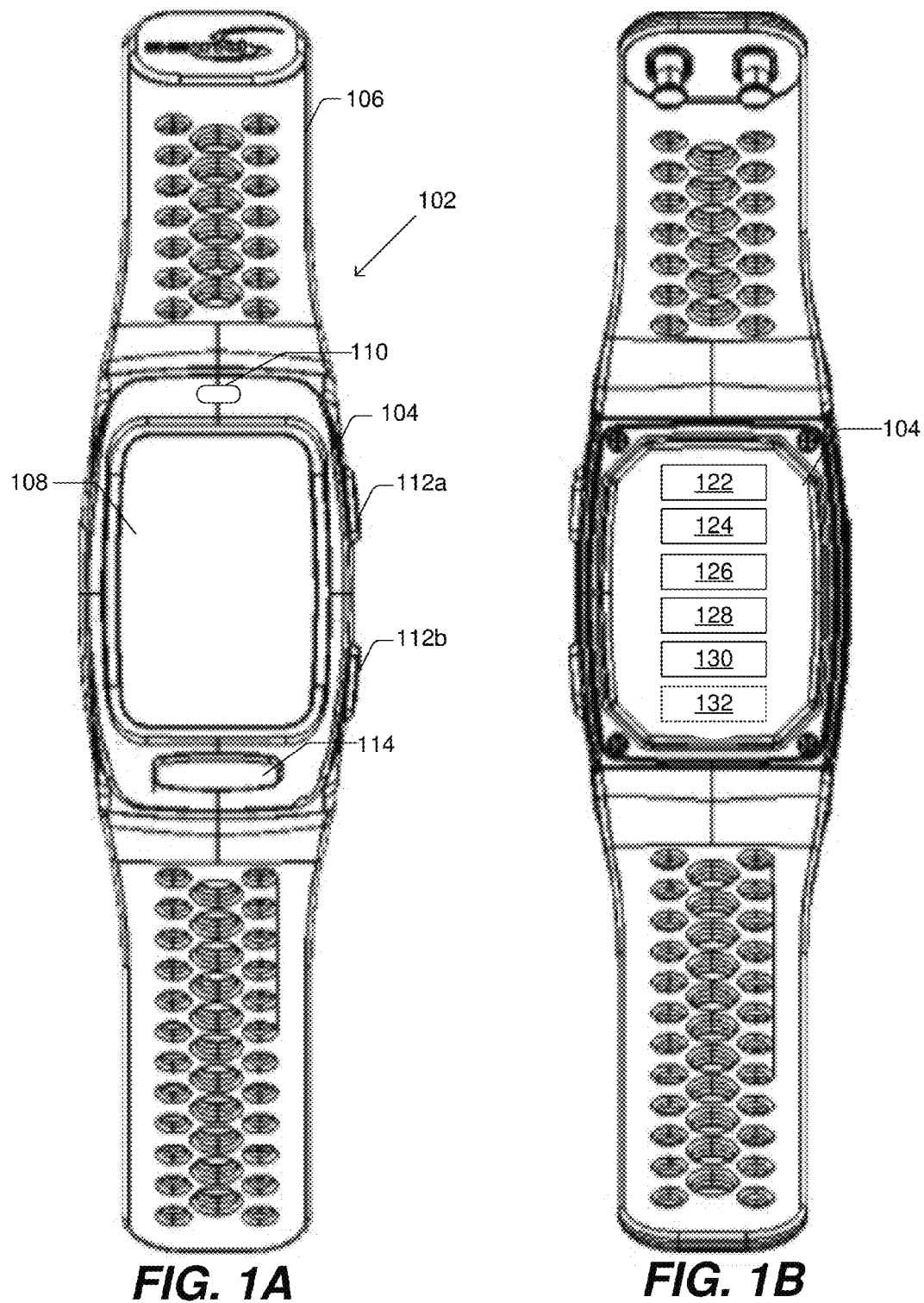
FIG. 1A depicts a front view of a user-wearable device, according to an embodiment.
FIG. 1B depicts a rear view of the user-wearable device of FIG. 1A, according to an embodiment.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

FIG. 1A depicts a front view of a user-wearable device 102, according to an embodiment. The user-wearable device 102 can be a standalone device which gathers and processes data and displays results to a user. Alternatively, the user-wearable device 102 can wirelessly communicate with a base station (252 in FIG. 2), which can be a mobile phone, a tablet computer, a personal data assistant (PDA), a laptop computer, a desktop computer, or some other computing device that is capable of performing wireless communication. The base station can, e.g., include a health and fitness software application and/or other applications, which can be referred to as apps. The user-wearable device 102 can upload data obtained by the device 102 to the base station, so that such data can be used by a health and fitness software application and/or other apps stored on and executed by the base station.

The user-wearable device 102 is shown as including a housing 104, which can also be referred to as a case 104. A band 106 is shown as being attached to the housing 104, wherein the band 106 can be used to strap the housing 104 to a user's wrist or arm. The housing 104 is shown as including a digital display 108, which can also be referred to simply as a display. The digital display 108 can be used to show the time, date, day of the week and/or the like. The digital display 108 can also be used to display activity and/or physiological metrics, such as, but not limited to, heart rate (HR), heart rate variability (HRV), calories burned, steps taken and distance walked and/or run. The digital display 108 can also be used to display sleep metrics, examples of which are discussed below. These are just examples of the types of information that may be displayed on the digital display 108, which are not intended to be all encompassing.

The housing 104 is also shown as including an outward facing ambient light sensor (ALS) 110, which can be used to detect ambient light, and thus, can be useful for detecting whether it is daytime or nighttime, as well as for other purposes. The housing 104 is further shown as including buttons 112a, 112b, which can individually be referred to as a button 112, and can collectively be referred to as the buttons 112. One of the buttons 112 can be a mode select button, while another one of the buttons 112 can be used to start and stop certain features. While the user-wearable device 102 is shown as including two buttons 112, more or less than two buttons can be included. The buttons 112 can additionally or alternatively be used for other functions. The housing 104 is further shown as including a forward facing ECG electrode 114, which is discussed below. This ECG electrode 114 can also function as an additional button.

Figure 2:
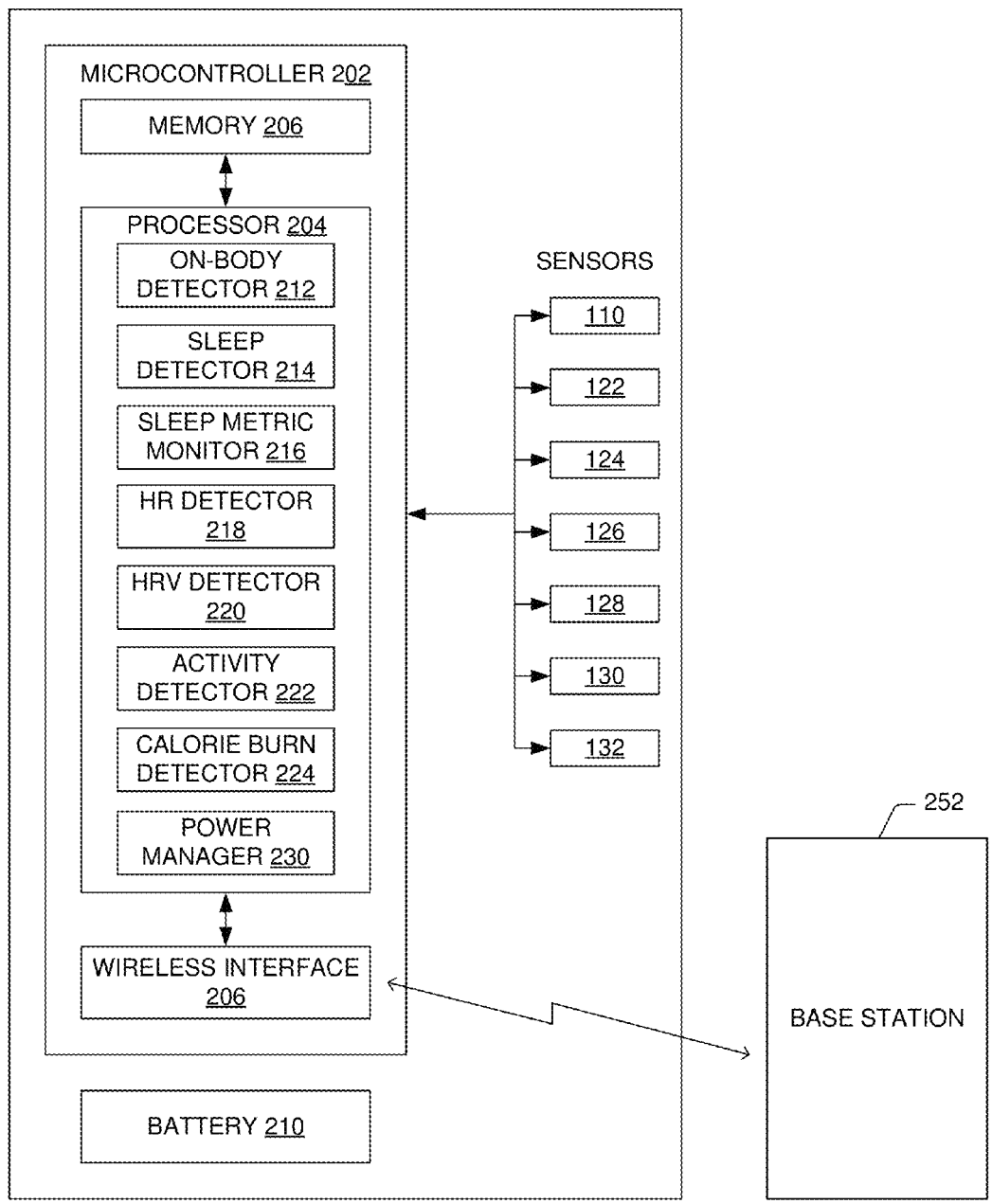
FIG. 2 depicts a high level block diagram of electrical components of the user-wearable device introduced in FIGS. 1A and 1B, according to an embodiment.

In certain embodiments, the user-wearable device 102 can receive alerts from a base station (e.g., 252 in FIG. 2). For example, where the base station 252 is a mobile phone, the user wearable device 100 can receive alerts from the base station, which can be displayed to the user on the display 108. For a more specific example, if a mobile phone type of base station 252 is receiving an incoming phone call, then an incoming phone call alert can be displayed on the digital display 108 of the mobile device, which may or may not include the phone number and/or identity of the caller. Other types of alerts include, e.g., text message alerts, social media alerts, calendar alerts, medication reminders and exercise reminders, but are not limited thereto. The user-wearable device 102 can inform the user of a new alert by vibrating and/or emitting an audible sound.

FIG. 1B illustrates a rear-view of the housing 104 of the user-wearable device 102. Referring to FIG. 1B, the backside of the housing 104 includes an optical sensor 122, a capacitive sensor 124, a galvanic skin resistance sensor 126, an electrocardiogram (ECG) sensor 128 and a skin temperature sensor 130. It is also possible that the user-wearable device 102 includes less sensors than shown, more sensors than shown and/or alternative types of sensors. For example, the user-wearable device 102 can also include one or more type of motion sensor 132, which is shown in dotted line because it is likely complete encased with the housing 104.

In accordance with an embodiment, the optical sensor 122 includes both a light source and a light detector, in which case the optical sensor 122 can be used to detect proximity of an object (e.g., a user's wrist or arm) relative to the optical sensor, as well as to detect ambient light. The light source of the optical sensor 122 can include one or more light emitting diode (LED), incandescent lamp or laser diode, but is not limited thereto. While infrared (IR) light sources are often employed in optical sensors, because the human eye cannot detect IR light, the light source can alternatively produce light of other wavelengths. The light detector of the optical sensor 122 can include one or more one or more photoresistor, photodiode, phototransistor, photodarlington or avalanche photodiode, but is not limited thereto. When operating as an optical proximity sensor, the light source of the optical sensor 122 is driven to emit light. If an object (e.g., a user's wrist or arm) is within the sense region of the optical sensor 122, a large portion of the light emitted by the light source will be reflected off the object and will be incident on the light detector. The light detector generates a signal (e.g., a current) that is indicative of the intensity and/or phase of the light incident on the light detector, and thus, can be used to detect the presence of the user's wrist or arm. The optical sensor 122 may also use its light detector to operate as an ambient light detector. It is also possible that the optical sensor 122 not include a light source, in which case the optical sensor 122 can operate as an ambient light sensor, but not a proximity sensor. When operating as an ambient light sensor, the optical sensor 122 produces a signal having a magnitude that is dependent on the amount of ambient light that is incident on the optical sensor 122. It is expected that when a user is wearing the user-wearable device 102 on their wrist or arm, the light detector of the optical sensor 122 will be blocked (by the user's wrist or arm) from detecting ambient light, and thus, the signal produced the light detector will have a very low magnitude.

In accordance with specific embodiments, the optical sensor 122 can also be used to detect heart rate (HR) and heart rate variability (HRV). More specifically, the optical sensor 122 can operate as a photoplethysmography (PPG) sensor. When operating as a PPG sensor, the light source of the optical sensor 122 emits light that is reflected or back-scattered by patient tissue, and reflected/backscattered light is received by the light detector of the optical sensor 122. In this manner, changes in reflected light intensity are detected by the light detector, which outputs a PPG signal indicative of the changes in detected light, which are indicative of changes in blood volume. The PPG signal output by the light detector can be filtered and amplified, and can be converted to a digital signal using an analog-to-digital converter (ADC), if the PPG signal is to be analyzed in the digital domain. Each cardiac cycle in the PPG signal generally appears as a peak, thereby enabling the PPG signal to be used to detect peak-to-peak intervals, which can be used to calculate heart rate (HR) and heart rate variability (HRV). In accordance with certain embodiments, the optical sensor 122 includes a light source that emits light of two different wavelengths that enables the optical sensor 122 to be used as a pulse oximeter, in which case the optical sensor 122 can non-invasively monitor the arterial oxygen saturation of a user wearing the user-wearable device 102.

In accordance with an embodiment, the capacitive sensor 124 includes an electrode that functions as one plate of a capacitor, while an object (e.g., a user's wrist or arm) that is in close proximity to the capacitive sensor 124 functions as the other plate of the capacitor. The capacitive sensor 124 can indirectly measure capacitance, and thus proximity, e.g., by adjusting the frequency of an oscillator in dependence on the proximity of an object relative to the capacitive sensor 124, or by varying the level of coupling or attenuation of an AC signal in dependence on the proximity of an object relative to the capacitive sensor 124.

The galvanic skin resistance (GSR) sensor 126 senses a galvanic skin resistance. The galvanic skin resistance measurement will be relatively low when a user is wearing the user-wearable device 102 on their wrist or arm and the GSR sensor 126 is in contact with the user's skin. By contrast, the galvanic skin resistance measurement will be very high when a user is not wearing the user-wearable device 102 and the GSR sensor 126 is not in contact with the user's skin.

The ECG sensor 128 can be used to obtain an ECG signal from a user that is wearing the user-wearable device 102 on their wrist or arm (in which case the ECG sensor 128, which is an electrode, is in contact with the user's wrist or arm), and the user touches the front facing electrode 114 with their other arm (e.g., with a finger of their other arm). Additionally, or alternatively, an ECG sensor can be incorporated into a chest strap that provides ECG signals to the user-wearable device 102. The skin temperature sensor 130 can be implemented, e.g., using a thermistor, and can be used to sense the temperature of a user's skin, which can be used to determine user activity and/or calories burned.

Depending upon implementation, heart rate (HR) and heart rate variability (HRV) can be detected based on signals obtained by the optical sensor 122 and/or the ECG sensor 128. HR and/or HRV can be automatically determined continuously, periodically or at other specified times or based on a manual user action. For example, in a free living application, HR can be determined automatically during periods of interest, such as when a significant amount of activity is detected.

Additional physiologic metrics can also be obtained using the sensors described herein. For example, respiration rate can be determined from a PPG signal obtained using the optical sensor 122 and/or from the ECG signal determined using the ECG sensor 128. For another example, blood pressure can be determined from PPG and ECG signals by determining a metric of pulse wave velocity (PWV) and converting the metric of PWV to a metric of blood pressure. More specifically, a metric of PWV can be determining by determining a time from a specific feature (e.g., an R-wave) of an obtained ECG signal to a specific feature (e.g., a maximum upward slope, a maximum peak or a dicrotic notch) of a simultaneously obtained PPG signal. An equation can then be used to convert the metric of PWV to a metric of blood pressure.

In accordance with an embodiment the motion sensor 132 is an accelerometer. The accelerometer can be a three-axis accelerometer, which is also known as a three-dimensional (3D) accelerometer, but is not limited thereto. The accelerometer may provide an analog output signal representing acceleration in one or more directions. For example, the accelerometer can provide a measure of acceleration with respect to x, y and z axes. The motion sensor 132 can alternatively be a gyrometer, which provides a measure of angular velocity with respect to x, y and z axes. It is also possible that the motion sensor 132 is an inclinometer, which provides a measure of pitch, roll and yaw that correspond to rotation angles around x, y and z axes. It is also possible the user wear-able device 102 includes multiple different types of motion sensors, some examples of which were just described. Depending upon the type(s) of motion sensor(s) used, such a sensor can be used to detect the posture of a portion of a user's body (e.g., a wrist or arm) on which the user-wearable device 102 is being worn.

FIG. 2 depicts an example block diagram of electrical components of the user-wearable device 102, according to an embodiment. Referring to FIG. 2, the user-wearable device 102 is shown as including a microcontroller 202 that includes a processor 204, memory 206 and a wireless interface 208. It is also possible that the memory 206 and wireless interface 208, or portions thereof, are external the microcontroller 202. The microcontroller 202 is shown as receiving signals from each of the aforementioned sensors 110, 122, 124, 126, 128 and 130. The user-wearable device 102 is also shown as including a battery 210 that is used to power the various components of the device 102. While not specifically shown, the user-wearable device 102 can also include one or more voltage regulators that are used to step-up and or step-down the voltage provided by the battery 210 to appropriate levels to power the various components of the device 102.

Each of the aforementioned sensors 110, 122, 124, 126, 128, 130, 132 can include or have associated analog signal processing circuitry to amplify and/or filter raw signals produced by the sensors. It is also noted that analog signals produced using the aforementioned sensors 110, 122, 124, 126, 128, 130 and 122 can be converted to digital signals using one or more digital to analog converters (ADCs), as is known in the art. The analog or digital signals produced using these sensors can be subject time domain processing, or can be converted to the frequency domain (e.g., using a Fast Fourier Transform or Discrete Fourier Transform) and subject to frequency domain processing. Such time domain processing, frequency domain conversion and/or frequency domain processing can be performed by the processor 204, or by some other circuitry.

The user-wearable device 102 is shown as including various modules, including an on-body detector module 212, a sleep detector module 214, a sleep metric module 216, a heart rate (HR) detector module 218, a heart rate variability (HRV) detector module 220, an activity detector module 222, a calorie burn detector module 224 and a power manager module 230. The various modules may communicate with one another, as will be explained below. Each of these modules 212, 214, 216, 218, 220, 222, 224 and 230 can be implemented using software, firmware and/or hardware. It is also possible that some of these modules are implemented using software and/or firmware, with other modules implemented using hardware. Other variations are also possible. In accordance with a specific embodiments, each of these modules 212, 214, 216, 218, 220, 222, 224 and 230 is implemented using software code that is stored in the memory 206 and is executed by the processor 204. The memory 206 is an example of a tangible computer-readable storage apparatus or memory having computer-readable software embodied thereon for programming a processor (e.g., 204) to perform a method. For example, non-volatile memory can be used. Volatile memory such as a working memory of the processor 204 can also be used. The computer-readable storage apparatus may be non-transitory and exclude a propagating signal.

The on-body detector module 212, which can also be referred to simply as the on-body detector 212, uses signals and/or data obtained from one or more of the above described sensors to determine whether the user-wearable device 102 is being worn by a user, as will be described in addition detail below with reference to FIGS. 6-10. Where the user-wearable device has the form factor of a wristwatch, e.g., as shown in FIGS. 1A and 1B, the on-body detector 212 may be referred to as a wrist-off detector or a wrist-on detector.

The sleep detector module 214, which can also be referred to simply as the sleep detector 212, uses signals and/or data obtained from one or more of the above described sensors to determine whether a user, who is wearing the user-wearable device 102, is sleeping. For example, signals and/or data obtained using the outward facing ambient light sensor (ALS) 110 and/or the motion sensor 132 can be used to determine when a user is sleeping. This is because people typically sleep in a relatively dark environment with low levels of ambient light, and typically move around less when sleeping compared to when awake. Additionally, if the user's arm posture can be detected from the motion sensor 132, then information about arm posture can also be used to detect whether or not a user is sleeping.

The sleep metric detector module 216, which can also be referred to as the sleep metric detector 216, uses information obtained from one or more of the above described sensors and/or other modules to quantify metrics of sleep, such as total sleep time, sleep efficiency, number of awakenings, and estimates of the length or percentage of time within different sleep states, including, for example, rapid eye movement (REM) and non-REM states. The sleep metric module 216 can, for example, use information obtained from the motion sensor 132 and/or from the HR detector 218 to distinguish between the onset of sleep, non-REM sleep, REM sleep and the user waking from sleep. One or more quality metric of the user's sleep can then be determined based on an amount of time a user spent in the different phases of sleep. Such quality metrics can be displayed on the digital display 108 and/or uploaded to a base station (e.g., 252) for further analysis.

The HR detector module 218, which can also be referred to simply as the HR detector 218, uses signals and/or data obtained from the optical sensor 122 and/or the ECG sensor 128 to detect HR. For example, the optical sensor 122 can be used to obtain a PPG signal from which peak-to-peak intervals can be detected. For another example, the ECG sensor 128 can be used to obtain an ECG signal, from which peak-to-peak intervals, and more specifically R-R intervals, can be detected. The peak-to-peak intervals of a PPG signal or an ECG signal can also be referred to as beat-to-beat intervals, which are intervals between heart beats. Beat-to-beat intervals can be converted to HR using the equation HR=(1/beat-to-beat interval)*60. Thus, if the beat-to-beat interval=1 sec, then HR=60 beats per minute (bpm); or if the beat-to-beat interval=0.6 sec, then HR=100 bpm. The user's HR can be displayed on the digital display 108 and/or uploaded to a base station (e.g., 252) for further analysis.

The HRV detector module 220, which can also be referred to simply as the HRV detector 220, uses signals and/or data obtained from the optical sensor 122 and/or the ECG sensor 128 to detect HRV. For example, in the same manner as was explained above, beat-to-beat intervals can be determined from a PPG signal obtained using the optical sensor 122 and/or from an ECG signal obtained using the ECG sensor 128. HRV can be determined by calculating a measure of variance, such as, but not limited to, the standard deviation (SD), the root mean square of successive differences (RMSSD), or the standard deviation of successive differences (SDSD) of a plurality of consecutive beat-to-beat intervals. Alternatively, or additionally, obtained PPG and/or ECG signals can be converted from the time domain to the frequency domain, and HRV can be determined using well known frequency domain techniques. The user's HRV can be displayed on the digital display 108 and/or uploaded to a base station (e.g., 252) for further analysis.

The activity detector module 222, which can also be referred to simply as the activity detector 222, can determine a type and amount of activity of a user based on information such as, but not limited to, motion data obtained using the motion sensor 132, heart rate as determined by the HR detector 218, an amount of ambient light as determined using the outwardly facing ambient light sensor 110, skin temperature as determined by the skin temperature sensor 130, and time of day. The activity detector module 222 can using motion data, obtained using the motion sensor 132, to determine the number of steps that a user has taken with a specified amount of time (e.g., 24 hours), as well as to determine the distance that a user has walked and/or run within a specified amount of time. Activity metrics can be displayed on the digital display 108 and/or uploaded to a base station (e.g., 252) for further analysis.

The calorie burn detector module 224, which can also be referred to simply as the calorie burn detector 222, can determine a current calorie burn rate and an amount of calories burned over a specified amount of time based on motion data obtained using the motion sensor 132, HR as determined using the HR detector 218, and/or skin temperature as determined using the skin temperature sensor 130. A calorie burn rate and/or an amount of calories burned can be displayed on the digital display 108 and/or uploaded to a base station (e.g., 252) for further analysis.

The power manager module 230, which can also be referred to simply as the power manager 230, uses signals and/or data obtained from one or more of the above described sensors and/or modules to determine when to disable certain circuitry and/or place certain circuitry in a low-power mode. For example, as will be described in additional detail below, the power manager 230 can disable the wireless interface 206 when the user-wearable device 102 is not being worn by a user. For another example, the power manager 230 can disable the optical sensor 122 and the ambient light sensor 110 when the user-wearable device 102 is not being worn by a user. The power manager 230 can also determine when to enable certain circuitry and/or place certain circuitry in a normal-power mode (as opposed to a low-power mode). More generally, the power manager 230 can cause the user-wearable device 102 to operate in a first mode when the user-wearable device is detected as being worn by a user, and can cause the user-wearable device to operate in a second mode when the user-wearable device is detected as not being worn by a user, wherein the second mode consumes less power than the first mode. When operated in the first mode, one or more of the above described sensors of the user-wearable device may be used to monitor activity and/or physiological metrics, such as, but not limited to, HR, HRV, calories burned, steps taken, and distance walked and/or ran. When operated in the second mode, at least one of the one or more sensors of the user-wearable device 102 used to monitor activity and/or physiological metrics are disabled, or placed in a low power mode. Additionally, the display 108 can be disabled or placed in a low power mode when the user-wearable device is operated in the second mode, and more specifically, when the on-body detector detects that the user-wearable device 102 is not being worn by a user.

The wireless interface 206 can wireless communicate with a base station (e.g., 252), which as mentioned above, can be a mobile phone, a tablet computer, a PDA, a laptop computer, a desktop computer, or some other computing device that is capable of performing wireless communication. The wireless interface 206, and more generally the user wearable device 102, can communicate with a base station 252 using various different protocols and technologies, such as, but not limited to, Bluetooth™, Wi-Fi, ZigBee or ultra-wideband (UWB) communication. In accordance with an embodiment, the wireless interface 206 comprises telemetry circuitry that include a radio frequency (RF) transceiver electrically connected to an antenna (not shown), e.g., by a coaxial cable or other transmission line. Such an RF transceiver can include, e.g., any well-known circuitry for transmitting and receiving RF signals via an antenna to and from an RF transceiver of a base station 252.

In order to enable wireless communication between the user-wearable device 102 and a base station 252, the wireless interface 206 can, from time to time, search for a base station 252 that is within a wireless communication range (e.g., within a certain distance) of the user-wearable device 102. Such searching can be performed periodically, e.g., once every minute or every five minutes, or at some other time intervals. Alternatively, or additionally, such searching can be performed in response to an event, such as in response to a user pressing a specific one or combination of the buttons 112, or using the buttons 112 to select a certain mode, such as a search mode. Once a base station 252 (with which the user-wearable device 102 can communicate) is identified, a wireless communication link can be established between the user-wearable device 102 and the base station 252. Depending upon the protocol and/or security features used, the user-wearable device 102 and the base station 252 may need to exchange keys, passwords, PIN codes, and/or the like, before a wireless communication link is established therebetween, as is well known in the art. It is also possible that the user may need to agree, e.g., by pressing a button, to establishing a wireless communication link. Thereafter, to maintain a wireless communication link between the user-wearable device 102 and the base station 252, housekeeping and/or link maintenance message types of packets may be periodically (e.g., once per second) wirelessly transmitted between the user-wearable device 102 and the base station 252.

It may be desirable to maintain a wireless communication link between the user-wearable device 102 and the base station 252, if the user-wearable device 102 is configured to receive alerts from the base station 252. For example, as mentioned above, where the base station 252 is a mobile phone, the user wearable device 100 can receive alerts from the base station 252 that specify that the user is receiving an incoming phone call. Such an alert can, e.g., be displayed on the digital display 108 of the mobile device, and may or may not include the phone number and/or identity of the caller. Other types of alerts that the base station 252 can wirelessly send to the user-wearable device 102 can include, e.g., text message alerts, social media alerts, calendar alerts, medication reminders and exercise reminders, but are not limited thereto. As mentioned above, the user-wearable device 102 can inform the user of a new alert by vibrating and/or emitting an audible sound. Alternatively, an alert may simply be displayed without an accompanying vibration or audible sound. Other variations are also possible.

The user-wearable device 102 draws current from its battery 210, and thereby consumes power, when it searches for a base station 252 with which to wirelessly communicate. Additionally, the user-wearable device 102 draws current from its battery 210, and thereby consumes power, when it establishes a communication link with a base station 252 and maintains a communication link with the base station 252. Where the battery 210 is a rechargeable type of battery, the more power consumed, the more often the battery 210 must be recharged. Where the battery 210 is a non-rechargeable type of battery, the more power consumed, the more often the battery 210 must be replaced with a new battery. In accordance with specific embodiments of the present invention, described below with reference to FIG. 3B, power consumption is reduced by disabling wireless communication between the user-wearable device 102 and a base station 252 when the user-wearable device 102 is detected as not being worn by a user. More generally, when the user-wearable device 102 is detected as not being worn by a user, the user-wearable device is operated in a low-power mode to conserve power, as will now be described with reference to FIG. 3A.

Figure 3A:
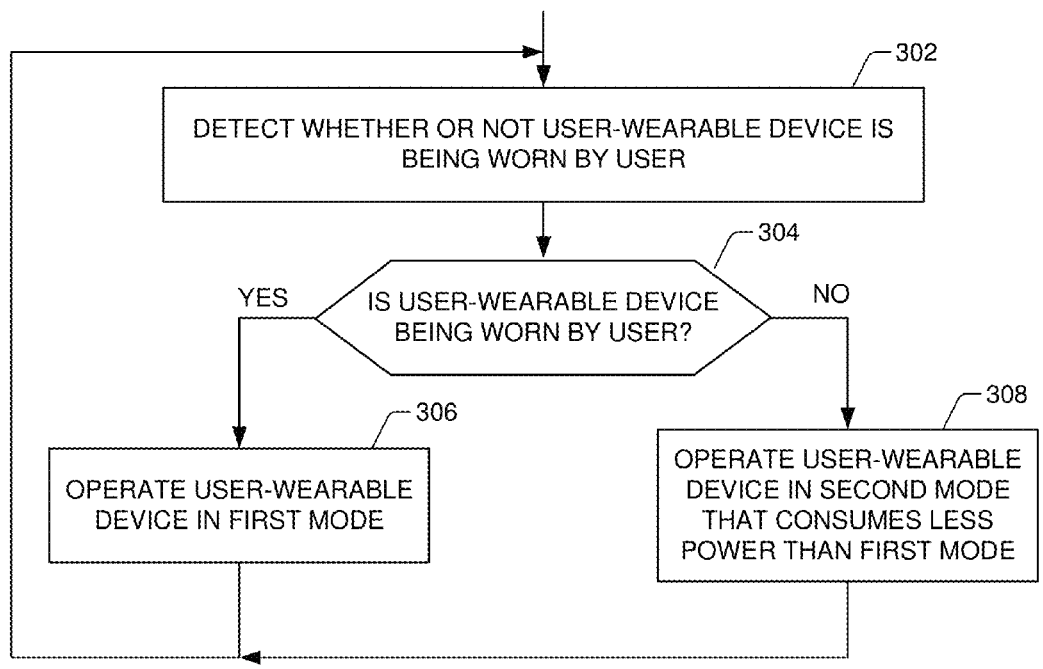
FIG. 3A is a high level flow diagram of a method for use with a user-wearable device, according to an embodiment.

Referring to the high level flow diagram of FIG. 3A, at step 302, there is a detection of whether or not the user-wearable device 102 is being worn by a user. Additional details of how to perform step 302 are described below with reference to FIGS. 6-10. If it is determined at step 304 that the user-wearable device 102 is indeed being worn by a user, then the user-wearable device 102 is operated in a first mode, as indicated at step 306. The first mode can be, e.g., the normal operating mode of the user-wearable device 102. If it is determined at step 304 that the user-wearable device 102 is not being worn by a user, then the user-wearable device 102 is operated in a second mode, as indicated at step 308, wherein the second mode consumes less power than the first mode. In accordance with certain embodiments, the on-body detector 212 performs step 302 and the power manager 230 performs the remaining steps shown in FIG. 3A.

Figure 3B:
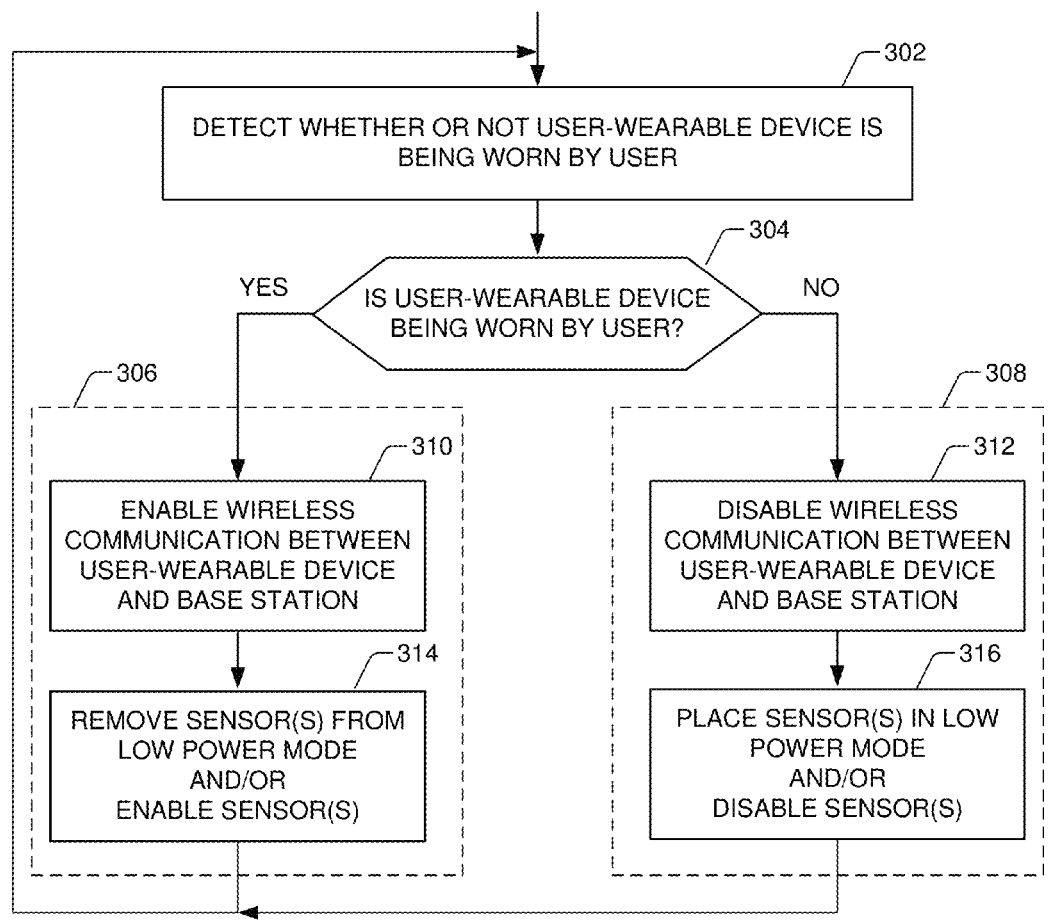
FIG. 3B is a high level flow diagram that provides additional details of some of the steps introduced in FIG. 3A.

Additional details of steps 306 and 308, according to specific embodiments of the present invention, will now be described with reference to FIG. 3B. More specifically, in FIG. 3B, step 306 of FIG. 3A is implemented as step as steps 310 and 314, and step 308 of FIG. 3A is implemented as steps 312 and 316. Referring to FIG. 3B, as indicated at step 310, when the user-wearable device 102 is detected as being worn by a user, wireless communication between the user-wearable 102 device and a base station (e.g., 252) is enabled. As indicated at step 312, when the user-wearable device 102 is detected as not being worn by a user, wireless communication between the user-wearable device 102 and a base station is disabled. More generally, at one of steps 310 and 312 the user-wearable device's wireless communication capabilities are enabled or disabled in dependence on whether or not the user-wearable device is being worn by a user.

As indicated at step 316, when the user-wearable device 102 is detected as not being worn by a user, one or more sensors of the user-wearable device is/are placed in a low power mode and/or one or more sensor of the user-wearable device is/are disabled. For example, if the optical sensor 122 is normally used to obtain a PPG signal while the device 102 is worn by a user, e.g., for the purpose of determining HR and/or HRV, then while the device 102 is not being worn by a user the optical sensor 122 need not be used to obtain a PPG signal, which will conserve power. Accordingly, the optical sensor 122 may disabled when the device 102 is not being worn by a user. Alternatively, the optical sensor 122 may be put in a low power mode where it is only used as an ambient light sensor while the device 102 is not being worn by a user, so that levels of ambient light can be used to detect when the device 102 is again worn by the user, as explained below with reference to FIG. 10. It is also possible to periodically, e.g., once per second, operate the optical sensor 122 as an optical proximity sensor while the device 102 is not being worn by a user, so that levels of proximity can be used to detect when the device 102 is again worn by a user, as explained below with reference to FIG. 9. It is also possible to disable the optical sensor 122 when the device 102 is not being worn by a user, especially where one or more of the other sensors is/are used to detect whether or not the device 102 is worn by a user.

As indicated at step 314, when the user-wearable device 102 is detected as being worn by a user, one or more sensors of the user-wearable device that had been placed in a low power mode, or had been disabled, can be removed from the low power mode and/or enabled. This way, the sensors can resume being used to detector or monitor various metrics while the device 102 is being worn by a user. In accordance with certain embodiments, the on-body detector 212 performs step 302 and the power manager 230 performs the remaining steps shown in FIG. 3B.

The order of steps 310 and 314 can be reversed. Similarly, the order of steps 312 and 316 can be reversed. It is also possible that steps 302, 304, 310 and 312 can be performed, without steps 314 and 316 being performed. It is also possible that steps 302, 304, 314 and 316 can be performed, without steps 310 and 312 being performed. More generally, the order of certain steps can be changed and/or certain steps can be eliminated while still being within the scope of an embodiment of the present invention.

Figure 4:
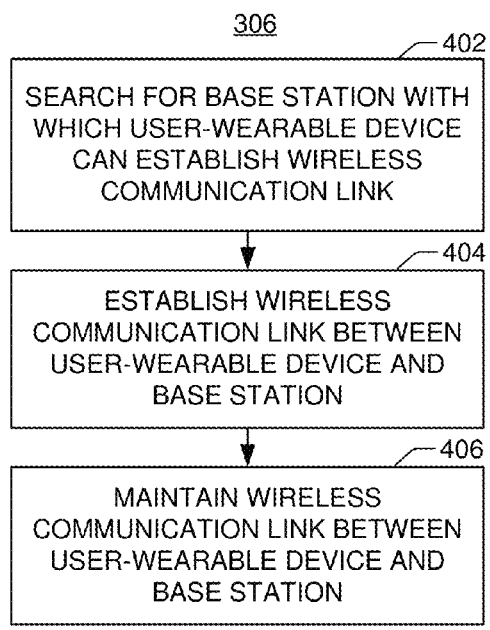
FIG. 4 is a high level flow diagram that provides additional details of one of the steps introduced in FIG. 3B that involves enabling wireless communication.

Additional details of step 310 will now be described with reference to the high level flow diagram of FIG. 4. Referring to FIG. 4, enabling wireless communication between the user-wearable device and a base station can include searching for a base station with which the user-wearable device can establish a wireless communication link, as indicated at step 402. Enabling wireless communication between the user-wearable device and a base station can also include establishing a wireless communication link between the user-wearable device and a base station, as indicated at step 404. Additionally, enabling wireless communication between the user-wearable device and a base station can include maintaining a wireless communication link between the user-wearable device and a base station, as indicated at step 406.

Figure 5:
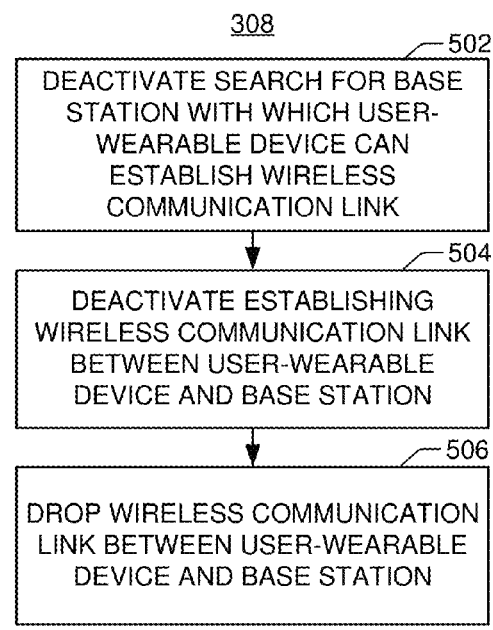
FIG. 5 is a high level flow diagram that provides additional details of one of the steps introduced in FIG. 3B that involves disabling wireless communication.

Additional details of step 312 will now be described with reference to the high level flow diagram of FIG. 5. Referring to FIG. 5, disabling wireless communication between the user-wearable device and a base station can include deactivating searching for a base station with which the user-wearable device can establish a wireless communication link, as indicated at step 502. This will conserve power, since as mentioned above, the user-wearable device draws current from its battery 210, and thereby consumes power, when it searches for a base station 252 with which to wirelessly communicate. Disabling wireless communication between the user-wearable device and a base station can also include deactivating establishing a wireless communication link between the user-wearable device and a base station, as indicated at step 504. Step 504 may occur, for example, if the user-wearable device 102 has already identified (as a result of searching) a base station with which to establish a wireless communication link, but before the wireless communication link is fully established, determines that the user-wearable device is no longer being worn by a user. Additionally, disabling wireless communication between the user-wearable device and a base station can include dropping a wireless communication link between the user-wearable device and a base station, as indicated at step 506. Step 506 may occur, for example, if the user-wearable device 102 has already established a wireless communication link with a base station, and then there is a detection that the user-wearable device is no longer being worn by a user.

Figure 3C:
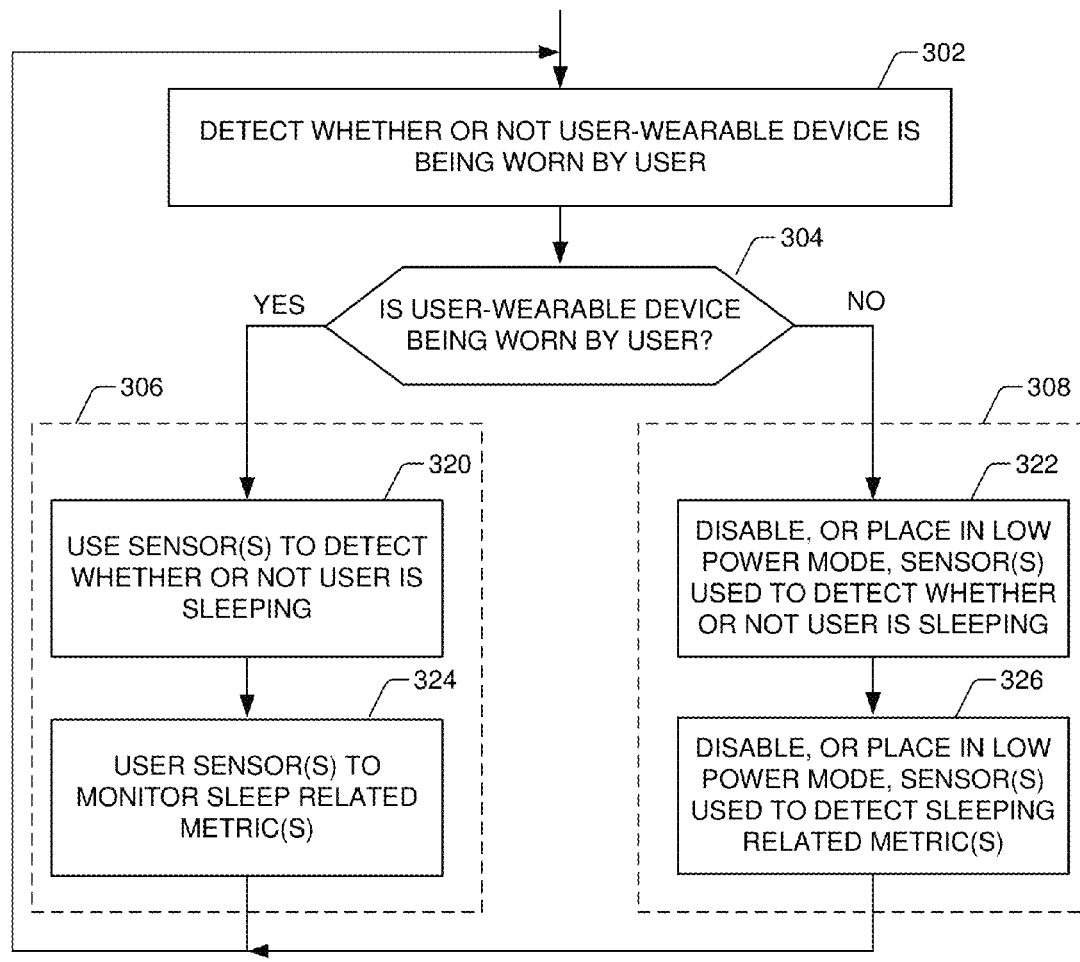
FIG. 3C is a further high level flow diagram that provides additional details of some of the steps introduced in FIG. 3A.

Additional details of steps 306 and 308, according to specific embodiments of the present invention, will now be described with reference to FIG. 3C. More specifically, in FIG. 3C, step 306 of FIG. 3A is implemented as step as steps 320 and 324, and step 308 of FIG. 3A is implemented as steps 322 and 326. As explained above, the sleep detector 214 can use signals and/or data obtained from one or more of the above described sensors to determine whether or not a user, who is wearing the user-wearable device 102, is sleeping. For example, signals and/or data obtained using the outward facing ALS 110 and/or the motion sensor 132, together with time of day information, can be used to determine whether or not a user is sleeping. Referring to FIG. 3C, as indicated at step 320, when the user-wearable device 102 is detected as being worn by a user, one or more sensors that is/are used to detect whether or not a user is sleeping is/are enabled. As indicated at step 322, when the user-wearable device 102 is detected as not being worn by a user, at least one sensor that is used to detect whether or not a user is sleeping is disabled or put in a low power mode, in order to conserve power. More generally, at one of steps 320 and 322 at least one sensor used to detect whether a user is sleeping is enabled, disabled or placed in low power mode in dependence on whether or not the user-wearable device is being worn by a user. In accordance with certain embodiments, the on-body detector 212 performs step 302 and the power manager 230 performs the remaining steps shown in FIG. 3C.

One or more of the sensors that is/are used at step 320 can also be used at step 324. It is also possible that one or more sensors that is/are used at step 324 differ from the sensor(s) used at step 320. In an embodiment, only one of steps 422 and 324 is performed when the user-wearable device is detected as not being worn by a user. Further, as indicated at step 324, one or more sensors used to detect or monitor sleep related metrics is/are enabled when the user-wearable device is being worn by a user, assuming the user is determined to be asleep. By contrast, as indicated at step 326, one or more sensors used to detect or monitor sleep related metrics is/are disabled or placed in a low power mode when the user-wearable device is not being worn by a user.

Referring briefly back to FIG. 2, the sleep detector 214 and the sleep metric monitor 216 can also be disabled as when there is a detection that a user is not wearing the user-wearable device. For example, where the sleep detector 214 and the sleep metric monitor are implemented using software, the software associated with these modules is not executed when it is detected at step 302 that the user-wearable device is not being worn by a user.

There are various different techniques that the on-body detector 212 can use to detect, at step 302, whether or not the user-wearable device 102 is being worn by a user. Such techniques can be performed by the on-body detector 212 using signals and/or data obtained using one or more of the sensors 110, 122, 124, 126, 128, 130, 132. Exemplary details of such techniques will now be described below with reference to FIGS. 6-10.

Figure 6:
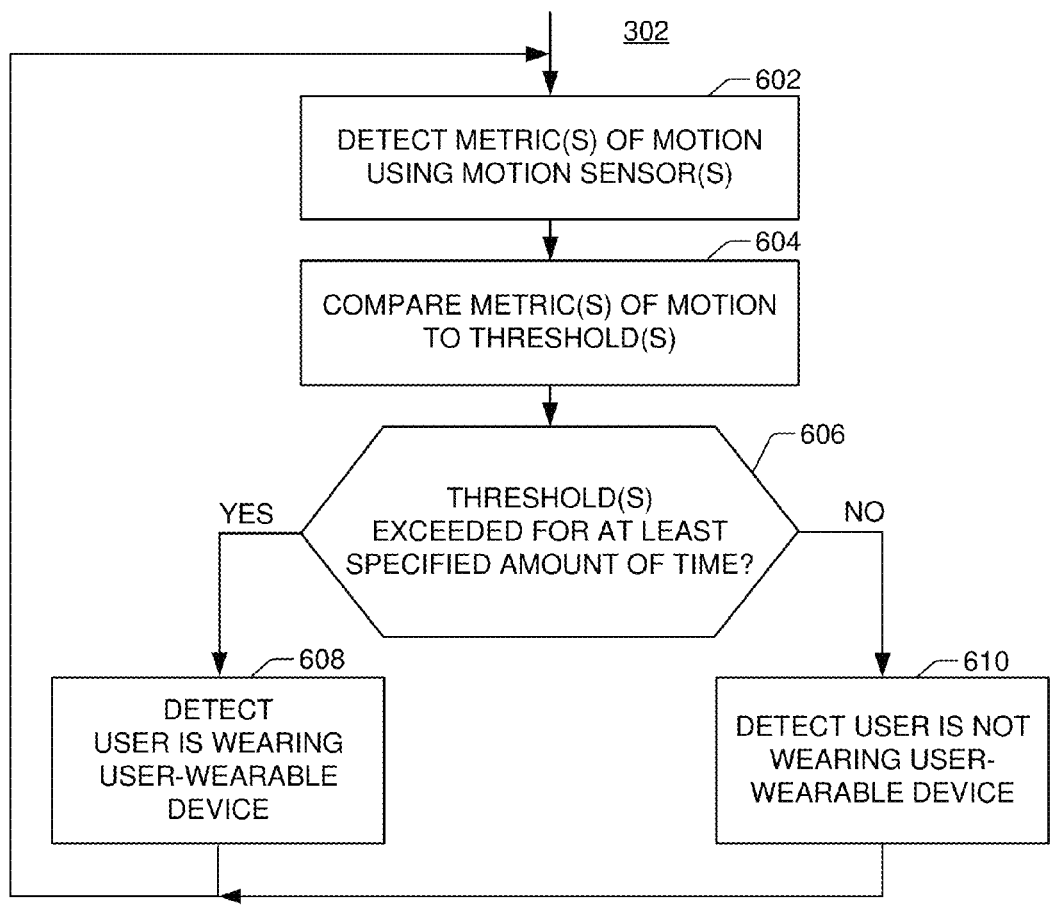
FIG. 6 is a high level flow diagram that provides additional details of one of the steps introduced in FIG. 3A that involves using a motion sensor to determine whether or not a user is wearing a user-wearable device.

FIG. 6 is used to describe a technique for using one or more motion sensors 132 to detect whether or not a user is wearing the user-wearable device 102. Referring to FIG. 6, at step 602 one or more metrics of motion are detected using one or more motion sensors 132. For example, if the motion sensor 132 is an accelerometer, then one or more metrics of acceleration can be detected at step 604, and compared to one or more respective acceleration thresholds at step 604. For another example, if the motion sensor 132 is an gyrometer, then one or more metrics of angular velocity can be detected at step 604, and compared to one or more respective angular velocity thresholds at step 604. If there is more than one type of motion sensor included in the user-wearable device, then metrics obtained using the multiple motion sensors can be compared to respective thresholds. It is expected that the user-wearable device 102 will experience greater levels of motion when being worn by a user, compared to when not being worn by a user. Indeed, the user-wearable device should experience no motion when not being worn by a user, assuming it is not located within a moving vehicle or is not otherwise being transported. Accordingly, if the threshold(s) is/are exceeded for at least a specified amount of time (e.g., 5 minutes or 10 minutes, but not limited thereto), as determined at step 606, then there is a detection at step 608 that the user-wearable device is being worn by a user. If the threshold(s) is/are not exceeded for at least the specified amount of time, as determined at step 606, then there is a detection at step 610 that the user-wearable device is not being worn by a user. In an embodiment, where there are multiple metrics of motion that are detected at step 602 and compared to respective thresholds at step 604, then the result of the decision at step 606 can be "yes" when all of the metrics exceed their respective threshold. Alternatively, the result of the decision at step 606 can be "yes" so long as at least one metric exceeds its respective threshold. In still another embodiment, the result of the decision at step 606 can be "yes" whenever a specified number of metrics exceed their respective threshold. Other variations are also possible.

One disadvantage of using one or more motion sensors 132 to detect whether or not a user is wearing the user-wearable device 102 is that under certain circumstances a portion of a user's body (e.g., wrist or arm) on which the user-wearable device is worn may remain relatively motionless for extended periods of time. For example, if a user is watching television with their arm resting on the armrest of a chair, or on their lap, their wrist and arm may remain relatively motionless for many minutes. For another example, if a user is in a deep sleep with their arm resting on a bed, their wrist and arm may remain relatively motionless for tens of minutes at a time. This means that if one or more motion sensor(s) 132 is/are the only type of sensor being used to detect whether or not a user is wearing the user-wearable device 102, it may take on the order of minutes, or tens of minutes, or potentially longer, before there to be a confident detection of whether or not a user is wearing the user-wearable device 102. If the decision at step 606 is made too quickly, there may be false detections that the user is not wearing the user-wearable device. In other words, if the specified amount of time (that motion threshold(s) must not be exceeded before the device 102 makes a determination that it is not being worn by a user) is too short, then it is easy to falsely detect that a user is not wearing the user-wearable device 102, even though the user is indeed actually wearing the user-wearable device 606, but has remained relatively motionless for a period of time.

Referring briefly back to FIG. 3, if wireless communication is disabled in order to conserve power while a user is not wearing the user-wearable device 102, then the longer it takes to confidently detect that a user is not wearing the user-wearable device 102 the less power conserved. For a specific example, if a user has removed the user-wearable device 102 but it takes 10 minutes for the user-wearable device 102 to confidently detect that the user is no longer wearing the device 102, then the device 102 may search for a base station with which to wirelessly communicate, establish a wireless communication link with a base station and/or maintain a wireless communication link with a base station for 10 minutes longer than necessary, which wastes power. On the other hand, if the decision is made too quickly that a user is not wearing the user-wearable device (e.g., because the user has been relatively motionless for a few seconds or minutes) when indeed the user actually is wearing the user-wearable device, then the wireless communication link may be inappropriately disabled, which may cause the user to not receive important alerts on their device 102 from a base station.

In accordance with certain embodiments of the present invention, in order to more quickly detect whether or not the user-wearable device 102 is being worn by a user, one or more other type of sensors besides (or in addition to) the motion sensor 132 is/are used. More specifically, as will be described in additional detail with reference to FIGS. 7-10, the capacitive sensor 124, the GSR sensor 126 and/or the optical sensor 122 can be used to detect whether or not the user-wearable device 102 is being worn by a user. Each of these types of sensors, which are considered examples of non-motion sensors, can be used to detect whether or not a user is wearing the user-wearable device within a few seconds and potentially faster, e.g., within less than a second. The capacitive sensor 124, the GSR sensor 126 and/or the optical sensor 122 are referred to herein as non-motion sensors because the signals they produce are not inherently indicative of motion. Nevertheless, signals output from these non-motion sensors can be used over a period of time to detect motion, e.g., by tracking changes in a metric of capacitance detected using the capacitive sensor, or by tracking changes in a metric of proximity detect using the optical sensor 122. By contrast, a signal output by a motion sensor, such as an accelerometer, is inherently indicative of motion and need not be tracked over time to detect motion.

Figure 7:
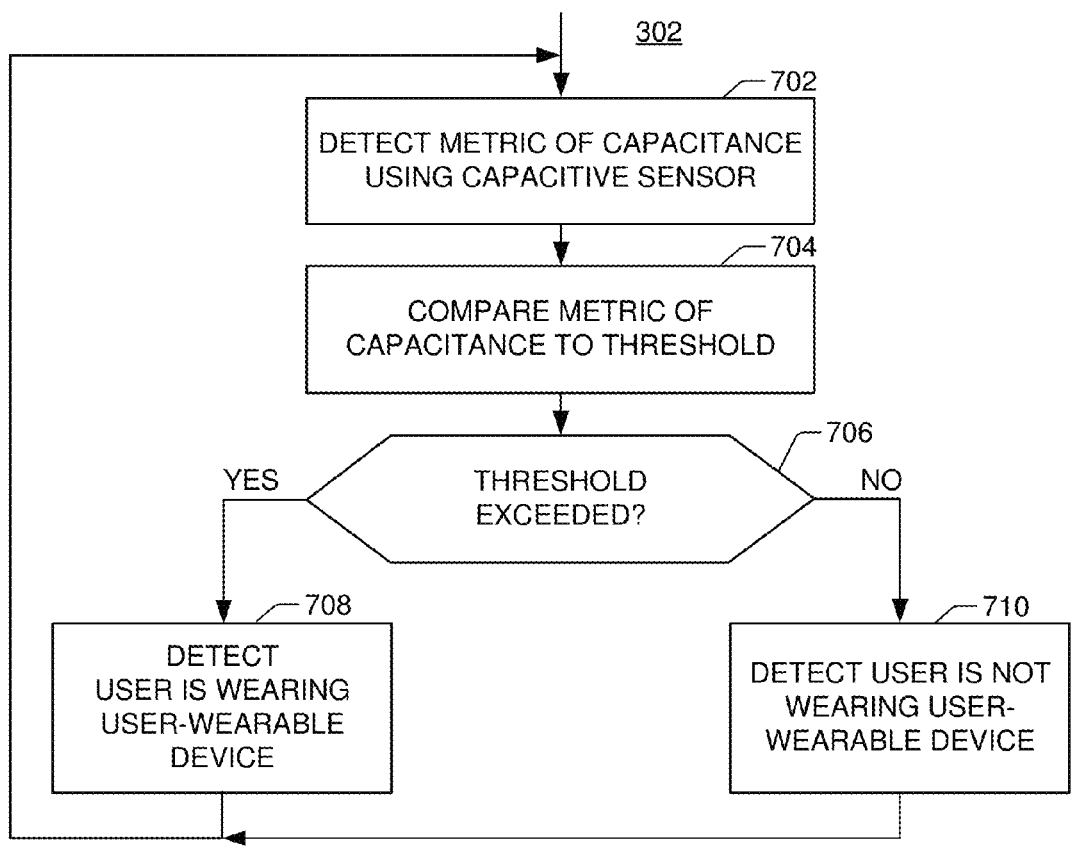
FIG. 7 is a high level flow diagram that provides additional details of one of the steps introduced in FIG. 3A that involves using a capacitive sensor to determine whether or not a user is wearing a user-wearable device.

FIG. 7 will now be used to describe a technique for using the capacitive sensor 124 to detect whether or not a user is wearing the user-wearable device 102. Referring to FIG. 7, at step 702 a metric of capacitance is obtaining using the capacitive sensor 124, wherein the closer an object (e.g., the user's wrist or arm) is to the electrode of the capacitive sensor 124, the greater the capacitance. Depending upon how the capacitive sensor 124 is implemented, the amplitude of an oscillating signal or a frequency of an oscillating signal increases with increases in capacitance, and thus, with reduction in distance between the capacitive sensor 124 and an object (e.g., the user's wrist or arm). Accordingly, the metric of capacitance obtained at step 702 can be a measure of amplitude or frequency, but is not limited thereto. At step 704 the metric of capacitance is compared to an appropriate threshold. If there is a determination at step 706 that the threshold is exceed, then there is a detection at step 708 that the user-wearable device is being worn by a user. If the threshold is not exceeded, as determined at step 706, then there is a detection at step 710 that the user-wearable device is not being worn by a user.

Figure 8:
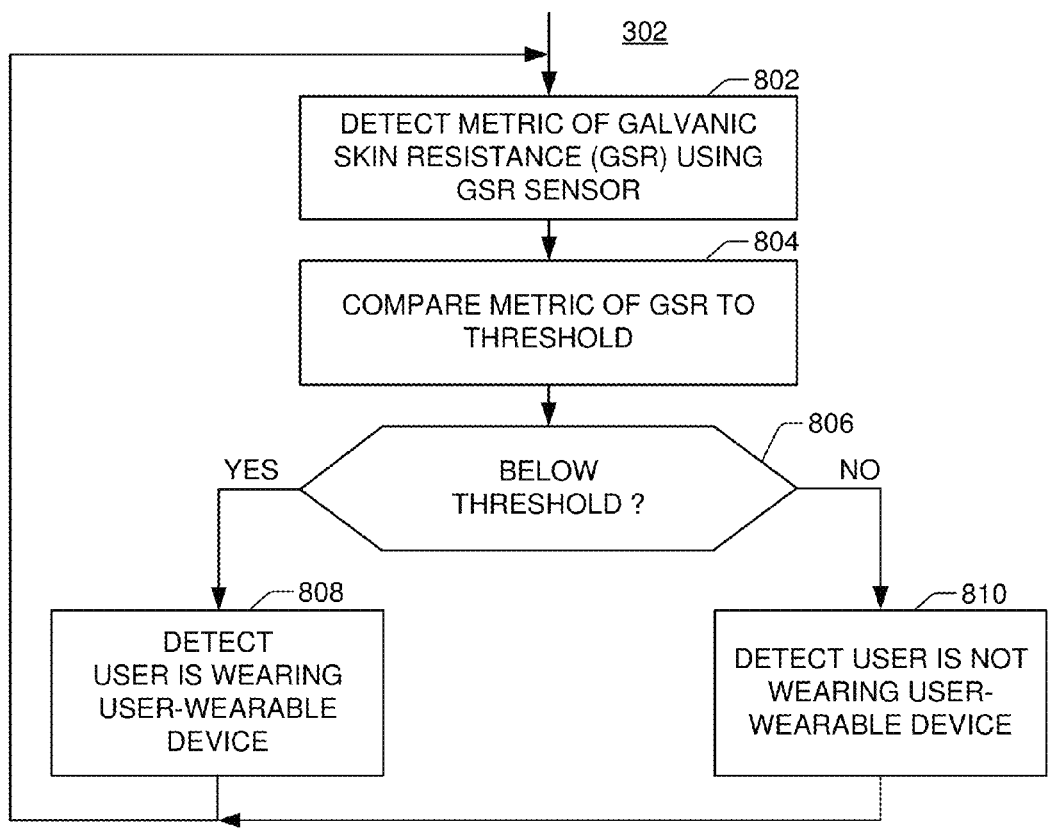
FIG. 8 is a high level flow diagram that provides additional details of one of the steps introduced in FIG. 3A that involves using a galvanic skin resistance sensor to determine whether or not a user is wearing a user-wearable device.

FIG. 8 will now be used to describe a technique for using the GSR sensor 126 to detect whether or not a user is wearing the user-wearable device 102. Referring to FIG. 8, at step 802 a metric of galvanic skin resistance (GSR) is obtaining using the GSR sensor 126. The GSR will be relatively low when the GSR sensor 126 is in contact with a user's skin, and will be relatively high when the GSR sensor 126 is not in contact with a user's skin. At step 804 the metric of GSR is compared to an appropriate threshold. If there is a determination at step 806 that the GSR metric is below the threshold, then there is a detection at step 808 that the user-wearable device is being worn by a user. If the GSR metric is not below the threshold, as determined at step 806, then there is a detection at step 810 that the user-wearable device is not being worn by a user.

Figure 9:
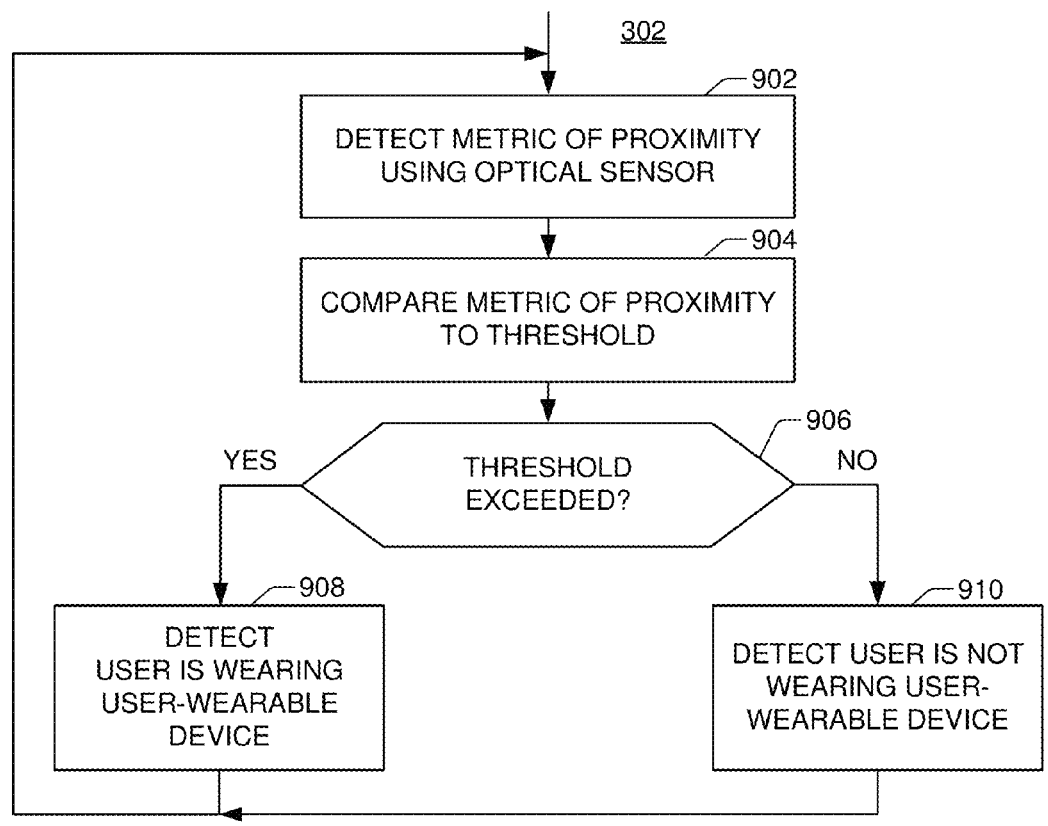
FIG. 9 is a high level flow diagram that provides additional details of one of the steps introduced in FIG. 3A that involves using an optical sensor configured as a proximity sensor to determine whether or not a user is wearing a user-wearable device.

FIG. 9 will now be used to describe a technique for using the optical sensor 122 to detect whether or not a user is wearing the user-wearable device 102, wherein the optical sensor includes a light source and a light detector that collective operate as an optical proximity detector. Referring to FIG. 9, at step 902 a metric of proximity is obtaining using the optical sensor 122. The metric of proximity can be the amplitude of the signal produced by the light detector of the optical sensor 122, in response to light being emitted by the light source of the optical sensor 122 and reflected from the user's skin and incident on the light detector. Alternatively, or additionally, the metric of proximity can be the phase offset of the signal produced by the light detector of the optical sensor 122 (in response to light being emitted by the light source of the optical sensor 122 and reflected from the user's skin and incident on the light detector) relatively to the phase of the light emitted by the light source of the optical sensor. At step 904 the metric of proximity is compared to an appropriate threshold. If there is a determination at step 906 that the metric of proximity is above the threshold, then there is a detection at step 908 that the user-wearable device is being worn by a user. If the metric of proximity is not above the threshold, as determined at step 906, then there is a detection at step 910 that the user-wearable device is not being worn by a user.

Figure 10:
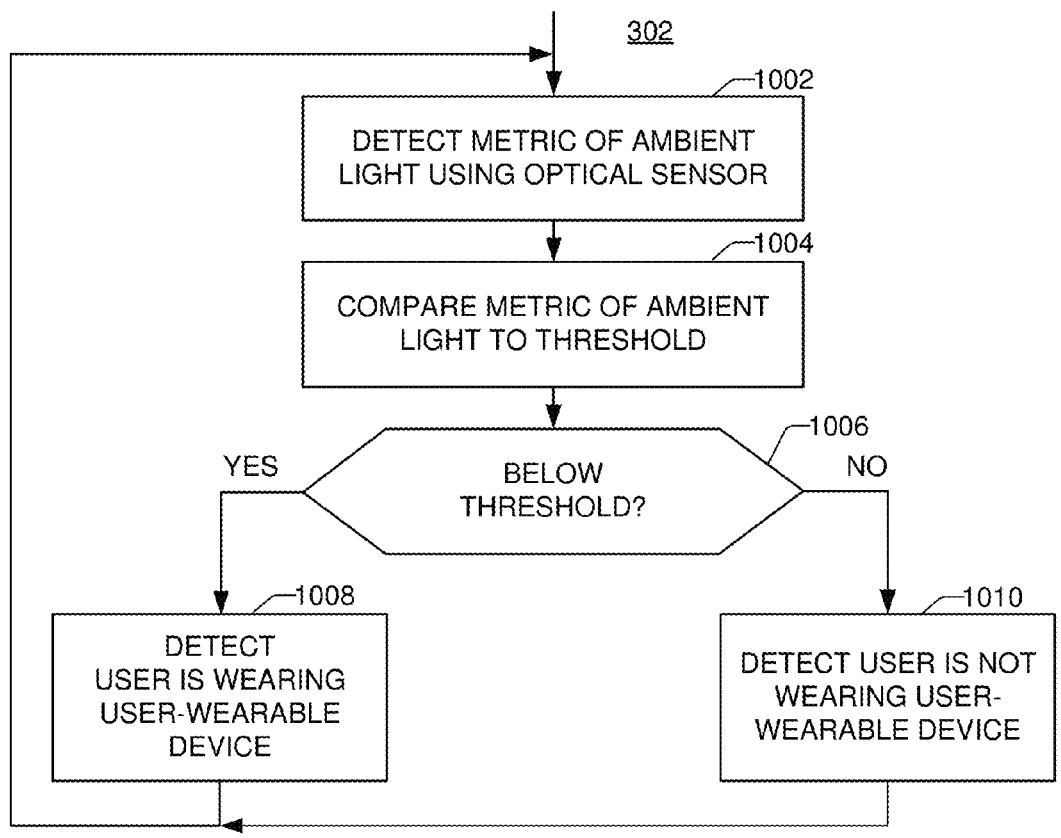
FIG. 10 is a high level flow diagram that provides additional details of one of the steps introduced in FIG. 3A that involves using an optical sensor configured as an ambient light sensor to determine whether or not a user is wearing a user-wearable device

FIG. 10 will now be used to describe a technique for using the optical sensor 122 to detect whether a user is wearing the user-wearable device 102, wherein the optical sensor 122 includes a light detector that operates as an ambient light sensor that will be at least substantially covered when a user is wearing the user-wearable device 102. More specifically, because the optical sensor 122 is placed against a user's skin when a user is wearing the user-wearable device 102, substantially no ambient light should reach the light sensor. Referring to FIG. 10, at step 1002 an ambient light metric is obtaining using the optical sensor 122. The ambient light metric can be the amplitude of the signal produced by the light detector of the optical sensor 122 that is operating as an ambient light sensor. At step 1004 the metric of ambient light is compared to an appropriate threshold. If there is a determination at step 1006 that the metric of ambient light is below the threshold, then there is a detection at step 1008 that a user is wearing the user-wearable device. If the metric of ambient light is not above the threshold, as determined at step 1006, then there is a detection at step 1010 that a user is not wearing the user-wearable device.

It is also possible that combinations of the embodiments described above with reference to FIGS. 6-10 can be used to detect whether or not a user is wearing the user-wearable device 102. In other words, more than one of the above described sensors can be used to detect whether or not a user is wearing the user-wearable device 102. In other words, multiple different techniques for detecting whether or not a user is wearing the user-wearable device 102 can be performed in parallel and/or serially.

In accordance with an embodiment, the optical sensor 122 and/or the capacitive sensor 124 can also be used by the on-body detector 212 to detect when the user-wearable device is being worn by a user, but is being worn more loosely than preferred such that one or more sensors operate in a less than optimal manner. Preferably, the sensors on the backside of the housing 104 should be in contact with a patient's skin to operate in their optimal manner. If not contacting the skin, signals produced by one or more of the sensors may be noisy and/or inaccurate. As explained herein, the on-body detector 212 can compare signals or metrics produced using sensors to corresponding thresholds to determine whether or not the user-wearable device 102 is being worn by a user. Further thresholds can be used to determine if the device 102, even though being worn, is being worn more loosely than preferred, e.g., such that the sensors do not contact with the user's skin. Where the on-body detector 212 detects that the user-wearable device 102 is being worn more loosely than preferred, the user can be instructed, e.g., via a message displayed on the display 108, that they should tighten or otherwise adjust the device 102 such that the device 102 is in better contact with the user's skin.

Figure 11:
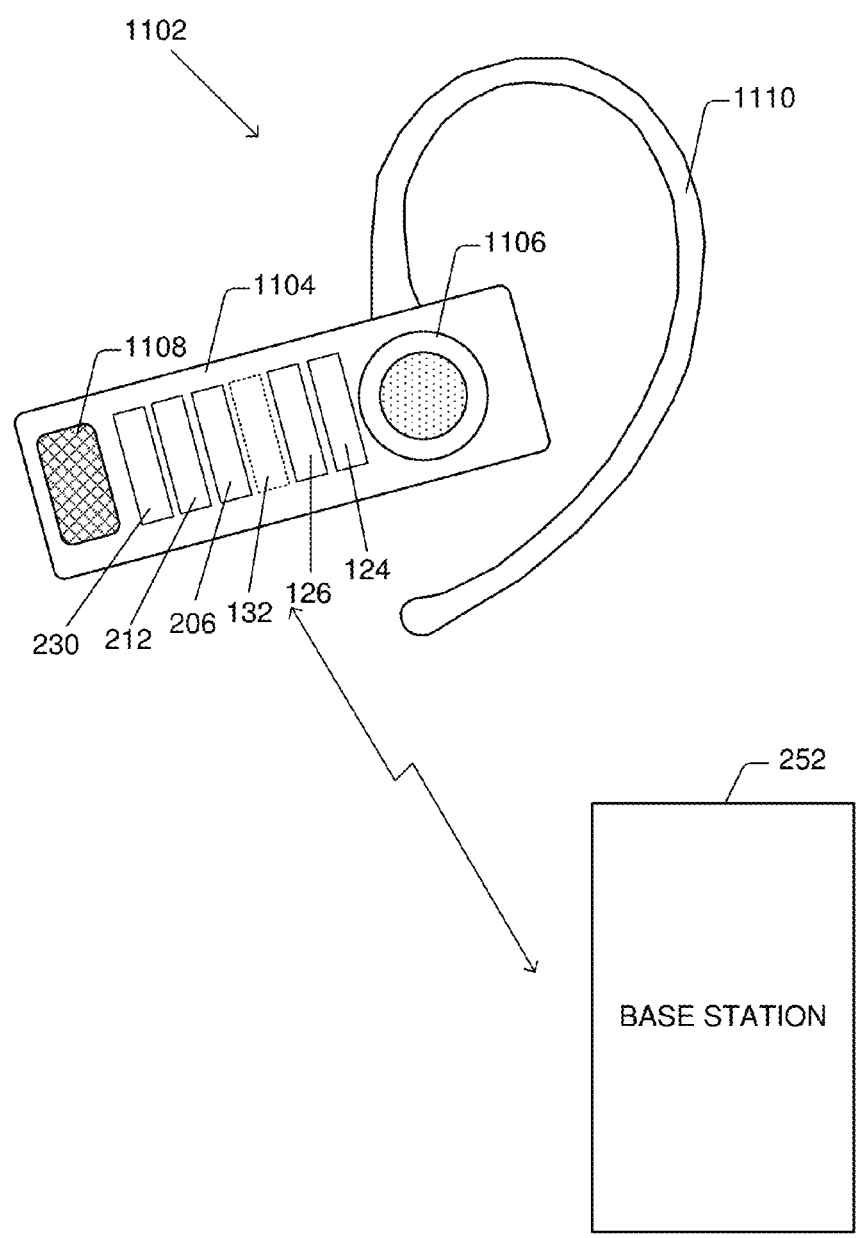
FIG. 11 illustrates a user-wearable device, according to a further embodiment.

In FIGS. 1A and 1B the user-wearable device 102 was shown as being a wrist-wearable device. As shown in FIG. 11, a user-wearable device 1102 can alternatively be an earpiece or headset configured to wirelessly receive audio signals from a base station (e.g., 252) with which a wireless communication link is established. For example, the user-wearable device 1102 can use Bluetooth™ of some other protocol and wireless technology to receive and transmit audio signals from/to a mobile phone type of base station with which a wireless communication link is established. Advantageously, the earpiece or headset type of user-wearable device 1102, which is powered by a battery, will disable wireless communication when it is detected that the earpiece or headset type of user-wearable device 1102 is not being worn by a user, which will conserve power.

Referring to FIG. 11, the user-wearable device 1102 is shown as including a housing 1104 within which is a wireless interface 206 that can be similar to the wireless interface 206 described above with reference to FIG. 2. An ear hook 1110 is shown as being attached to the housing 1104, to enable the device 1102 to be worn on a user's ear. Alternative mechanisms, such as a head band, can be used to enable the device 1102 to be worn by a user. The user-wearable device 1102 also includes a speaker 1106 and a microphone 1108 that are used to output and receive audio signals, as is known in the art. The user-wearable device 1102 shown in FIG. 11 can include many of the same sensors discussed above, with reference to FIGS. 1B and 2, which can be used to detect whether or not the user wearable device 1102 is being worn by a user. For example, the user-wearable device 1102 can include a capacitive sensor 124 and/or a GSR sensor 126, as shown. It is also possible that the user-wearable device 102 includes less sensors than shown, more sensors than shown and/or alternative types of sensors. For example, the user-wearable device 102 can also include one or more type of motion sensor 132, which is shown in dotted line because it is likely encased within the housing 1104. The sensors can be in or on the housing 1104, or one or more of the sensors can instead be at least partially within or on the ear hook 1110. Preferably, the capacitive sensor 124 and/or the GSR sensor 126 is located such that when the device 1102 is worn by a user (e.g., on a user's ear) the sensor touches the user's skin, or is at least in very close proximity to the user's skin. The device 1102 can also include an on-body detector 212, a power manager 230 and a battery 210, similar to those described above with reference to FIG. 2. The on body-detector 212 can detect whether or not the device 1102 is being worn by a user in the same manners as were described above, e.g., with reference to FIGS. 6-8. When the device 1102 is being worn by a user, it can operate in a first mode. When the device 1102 is not being worn by a user, the device can be operate in a second mode that consumes less power than the first mode. For example, when in the first mode wireless communication with a base station (e.g., 252) can be enabled, and when in the second mode wireless communication with a base station can be disabled in order to conserve power.

Certain embodiments of the present invention, which were described above, relate to a user-wearable device that is configured to wirelessly communicate with a base station and methods for use with such a user-wearable device. Such a user-wearable device can include one or more sensors and a wireless communication interface configured to wirelessly communicate with a base station. The base station can be a computing device that is capable of performing wireless communication, such as a mobile phone, a tablet computer or a laptop computer, but is not limited thereto. The user-wearable device can also include an on-body detector that is configured to use at least one of the sensor(s) of the user-wearable device to detect whether or not the user-wearable device is being worn by a user. The user-wearable device can be a wrist-wearable device configured to receive alerts from a base station with which a wireless communication link is established. The wrist-wearable device can alternatively, or additionally, be configured to determine and display activity and/or physiological metrics, such as, but not limited to, heart rate, heart rate variability, calories burned, steps taken, or distance walked and/or ran. The wrist-wearable device may also be able to determine when a user is sleeping, and may determine and display sleep related metrics. Each of the aforementioned metrics can additionally, or alternatively, be wirelessly transmitted to a base station so that one or more applications running on the base station can analyze such metrics or data indicative thereto. In alternative embodiments, rather than being a wrist-wearable device, the user-wearable device can be an earpiece or headset configured to wirelessly receive audio signals from a base station with which a wireless communication link is established.

In accordance with specific embodiments, a method includes detecting whether or not the user-wearable device is being worn by a user. Such a step can be performed, e.g., by the aforementioned on-body detector. In accordance with specific embodiments, when the user-wearable device is detected as being worn by a user, wireless communication between the user-wearable device and a base station is enabled. Conversely, when the user-wearable device is detected as not being worn by a user, wireless communication between the user-wearable device and a base station is disabled in order to conserve power.

In accordance with specific embodiments, one or more of a capacitive sensor, an optical sensor or a galvanic skin resistance sensor is/are used to detect whether or not the user-wearable device is being worn by a user. In other embodiments, a motion sensor can additionally or alternatively be used to detect whether or not the user-wearable device is being worn by a user.

In accordance with specific embodiments, in order to conserver power, one or more of a plurality of sensors of the user-wearable device is/are placed in a low power mode when the user-wearable device is detected as not being worn by a user. Alternatively, or additionally, one or more of a plurality of sensors of the user-wearable device is/are disabled when the user-wearable device is detected as not being worn by a user. In accordance with an embodiment, a power manager of the user-wearable device determines when to place circuitry (e.g., sensors and/or a wireless communication interface) in a normal power mode, a low power mode or in a disabled mode. More generally, when the user-wearable device is detected as being worn by a user the user-wearable device is operated in a first mode, and when the user-wearable device is detected as not being worn by a user the user-wearable device is operated in a second mode that consumes less power than the first mode. Operating the user-wearable device in the first mode can include enabling wireless communication between the user-wearable device and a base station. Operating the user-wearable device in the second mode can include disabling wireless communication between the user-wearable device and a base station. Operating the user-wearable device in the second mode can also include disabling one or more of a plurality of sensors of the user-wearable device and/or placing one or more of a plurality of sensors of the user-wearable device in a low power mode.

As mentioned above, in accordance with certain embodiments the user-wearable device is configured to monitor one or more sleep related metrics. In such embodiments, operating the user-wearable device in the first mode can include using one or more sensors of the user-wearable device to detect whether or not a user is sleeping, and operating the user-wearable device in the second mode (that consumed less power than the first mode) can include disabling, or placing in a low power mode, at least one of the sensors of the user-wearable device that is/are used to detect wherein or not a user is sleeping. Operating the user-wearable device in the second mode can also include disabling, or placing in a low power mode, one or more sensors of the user-wearable device that is/are used to obtain sleep related metrics.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto. While various embodiments have been described above, it should be understood that they have been presented by way of example, and not limitation. It will be apparent to persons skilled in the relevant art that various changes in form and detail can be made therein without departing from the spirit and scope of the invention. The breadth and scope of the present invention should not be limited by any of the above-described exemplary embodiments, but should be defined only in accordance with the following claims and their equivalents.

What is claimed is:

1. A method for use by a user-wearable device configured to wirelessly communicate with a base station, the method comprising:
   (a) detecting whether or not the user-wearable device is being worn by a user;
   (b) when the user-wearable device is detected as being worn by a user, enabling wireless communication between the user-wearable device and a base station; and
   (c) when the user-wearable device is detected as not being worn by a user, disabling wireless communication between the user-wearable device and a base station.

2. The method of claim 1, wherein:
   at step (b), the enabling wireless communication between the user-wearable device and a base station, comprises performing at least one of the following
      (b.1) searching for a base station with which the user-wearable device can establish a wireless communication link;
      (b.2) establishing a wireless communication link between the user-wearable device and a base station, or
      (b.3) maintaining a wireless communication link between the user-wearable device and a base station;
   at step (c), the disabling wireless communication between the user-wearable device and a base station, comprises performing at least one of the following
      (c.1) deactivating searching for a base station with which the user-wearable device can establish a wireless communication link;
      (c.2) deactivating establishing a wireless communication link between the user-wearable device and a base station, or (c.3) dropping a wireless communication link between the user-wearable device and a base station.

3. The method of claim 1, wherein step (a) comprises detecting whether or not the user-wearable device is being worn by a user using at least one of the following sensors:
a capacitive sensor;
an optical sensor; or
galvanic skin resistance sensor.

4. The method of claim 1, wherein step (a) comprises detecting whether or not the user-wearable device is being worn by a user using a motion sensor.

5. The method of claim 1, further comprising:
(d) when the user-wearable device is detected as not being worn by a user, performing at least one of the following:
(d.1) placing one or more sensors of the user-wearable device in a low power mode; or
(d.2) disabling one or more sensors of the user-wearable device.

6. The method of claim 1, wherein the user-wearable device comprises a wrist-wearable device configured to receive alerts from a base station with which a wireless communication link is established.

7. The method of claim 1, wherein the user-wearable device comprises an earpiece or headset configured to wirelessly receive and send audio signals from and to a base station with which a wireless communication link is established.

8. A user-wearable device, comprising:
a wireless communication interface configured to wirelessly communicate with a base station;
one or more sensors; and
an on-body detector configured to use at least one of the one or more sensors to detect whether or not the user-wearable device is being worn by a user;
a power manager configured to
enable the wireless communication interface when the on-body detector detects that the user-wearable device is being worn by a user, and
disable the wireless communication interface when the on-body detector detects that the user-wearable device is not being worn by a user.

9. The method of claim 1, wherein step (a) comprises detecting whether or not the user-wearable device is being worn by a user using an optical sensor that is also used to non-invasively monitor arterial oxygen saturation during at least a portion of a time when the user-wearable device is detected as being worn by a user.

10. The user-wearable device of claim 8, wherein:
the one or more sensors comprise at least one of a capacitive sensor, an optical sensor or a galvanic skin resistance sensor; and
the on-body detector is configured to use at least one of the at least one of a capacitive sensor, an optical sensor or a galvanic skin resistance sensor to detect whether or not the user-wearable device is being worn by a user.

11. The user-wearable device of claim 8, wherein:
the one or more sensors include a motion sensor; and
the on-body detector is configured to use the motion sensor to detect whether or not the user-wearable device is being worn by a user.

12. The user-wearable device of claim 8, wherein the power manager is also configured to disable, or place in a low power mode, at least one of the one or more sensors of the user-wearable device when the on-body detector detects that user-wearable device is not being worn by a user.

13. The user-wearable device of claim 8, wherein the user-wearable device comprises a wrist-wearable device configured to receive alerts from a base station with which a wireless communication link is established.

14. The user-wearable device of claim 8, wherein the user-wearable device comprises an earpiece or headset configured to wirelessly receive and send audio signals from and to a base station with which a wireless communication link is established.

15. A method for use by a user-wearable device, the method comprising:
(a) detecting whether or not the user-wearable device is being worn by a user, said detecting being performed using at least one of the following non-motion sensors
a capacitive sensor,
an optical sensor, or
a galvanic skin resistance sensor;
(b) when the user-wearable device is detected as being worn by a user, operating the user-wearable device in a first mode; and
(c) when the user-wearable device is detected as not being worn by a user, operating the user wearable device in a second mode, wherein the second mode consumes less power than the first mode.

16. The method of claim 15, wherein:
the user-wearable device comprises a user-wearable activity and/or physiological monitoring device that further comprises a motion sensor;
the one or more non-motion sensors and the motion sensor collectively comprise a plurality of sensors of the user-wearable device;
the operating the user-wearable device in the first mode at step (b) includes using one or more of the plurality of sensors of the user-wearable device to monitor one or more of the following metrics
heart rate,
heart rate variability,
calories burned,
steps taken, or
distance walked and/or ran; and
the operating the user-wearable device in the second mode at step (c) includes disabling, or placing in a low power mode, at least one of the one or more of the plurality of sensors of the user-wearable device that is/are used at step (b).

17. The method of claim 15, wherein:
the user-wearable device is configured to monitor one or more sleep related metrics;
the operating the user-wearable device in the first mode at step (b) includes using one or more of a plurality of sensors of the user-wearable device to detect whether or not a user is sleeping; and
the operating the user-wearable device in the second mode at step (c) includes disabling, or placing in a low power mode, at least one of the one or more of the plurality of sensors of the user-wearable device that is/are used at step (b) to detect whether or not a user is sleeping.

18. The method of claim 17, wherein:
the operating the user-wearable device in the first mode at step (b) includes using one or more sensors of the user-wearable device to monitor one or more sleep related metrics, if there is a determination that a user wearing the user-wearable device is sleeping; and
the operating the user-wearable device in the second mode at step (c) includes disabling, or placing in a low power mode, at least one of the one or more sensors of the user-wearable device that is/are used at step (b) to detect sleep related metrics.

19. A user-wearable device, comprising:
one or more non-motion sensors selected from the group consisting of a capacitive sensor, an optical sensor, or a galvanic skin resistance sensor;
an on-body detector configured to use at least one of the one or more non-motion sensors to detect whether or not the user-wearable device is being worn by a user; and
a power manager configured to
cause the user-wearable device to operate in a first mode, when the on-body detector detects that the user-wearable device is being worn by a user, and
cause the user-wearable device to operate in a second mode, when on-body detector detects that the user-wearable device is not being worn by a user, wherein the second mode consumes less power than the first mode.

20. The user-wearable device of claim 19, wherein:
the user-wearable device comprises a user-wearable activity and/or physiological monitoring device that further comprises a motion sensor;
the one or more non-motion sensors and the motion sensor collectively comprise a plurality of sensors of the user-wearable device;
when the user-wearable device is caused to operate in the first mode, at least one of the plurality of sensors of the user-wearable device is/are used to monitor one or more of the following metrics
heart rate,
heart rate variability,
calories burned,
steps taken, or
distance walked and/or ran; and
the power manager is configured to disable, or place in a low power mode, at least one of the plurality of sensors of the user-wearable device, when the user-wearable device is caused to operate in the second mode.

21. The user-wearable of claim 20, further comprising:
a sleep detector configured to use one or more of the plurality of sensors of the user-wearable device to detect whether or not a user that is wearing the user-wearable device is sleeping;
wherein the power manager is configured to disable, or place in a low power mode, at least one of the one or more of the plurality of sensors that is/are used by the sleep detector, when the user-wearable device is caused to operate in the second mode.

22. The user-wearable device of claim 21, further comprising:
a sleep metric monitor configured to use one or more of the plurality of sensors of the user-wearable device to detect one or more sleep related metrics, when the sleep detector detects that a user wearing the user-wearable device is sleeping;
wherein the power manager is configured to disable, or place in a lower power mode, at least one of the one or more of the plurality of sensors of the user-wearable device that is/are used by the sleep metric monitor, when the user-wearable device is caused to operate in the second mode.

* * * * *

UNITED STATES PATENT AND TRADEMARK OFFICE
CERTIFICATE OF CORRECTION

PATENT NO. : 9,442,523 B2
APPLICATION NO. : 14/341248
DATED : September 13, 2016
INVENTOR(S) : Lee et al.

It is certified that error appears in the above-identified patent and that said Letters Patent is hereby corrected as shown below:

On the title page item 57, Abstract, line 1: After "user-wearable" and before "includes" delete "devices" and replace with --device--, In the claims Column 19, line 67, claim 12: After "that" and before "user-wearable" insert --the--.

Signed and Sealed this
Twenty-ninth Day of November, 2016

Michelle K. Lee
*Director of the United States Patent and Trademark Office*